(No Model.)
M. H. SMITH.
Dead Pulley.
No. 238,723.  Patented March 8, 1881.
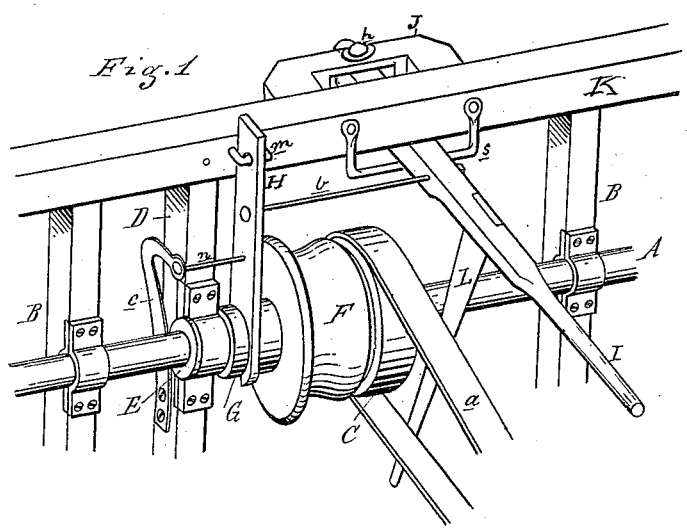
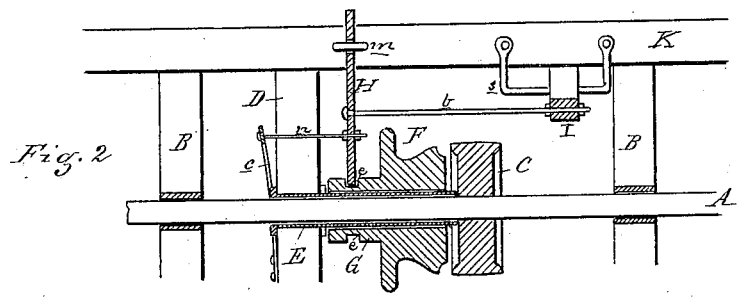
Attest:
A. Barthel
F. Scott
Inventor:
M. H. Smith
By Atty
Hat S. Sprague

UNITED STATES PATENT OFFICE.

MYRON H. SMITH, OF LAWTON, MICHIGAN.

DEAD-PULLEY.

SPECIFICATION forming part of Letters Patent No. 238,723, dated March 8, 1881.

Application filed August 30, 1880. (No model.)

*To all whom it may concern:*

Be it known that I, MYRON H. SMITH, of Lawton, Van Buren county, Michigan, have invented an Improvement in Dead-Pulleys, of which the following is a specification.

The nature of this invention relates to certain new and useful improvements in the construction of dead-pulleys designed to be used on line-shafting for receiving the belt from the fast pulleys employed for driving the machinery, thereby obviating the objectionable use of the loose pulleys or idlers as ordinarily constructed and used.

The invention consists in the peculiar construction and arrangement of a dead-pulley upon an independent shaft supported in an independent bearing or hanger, and adapted to receive the belt, as in the case of a loose pulley, and let it run down to a smaller diameter than the driving-pulley, so that the belt, the dead-pulley, and the machine to be driven will remain stationary with the belt hanging loosely, and in combination with such dead-pulley and its attachments, devices for shifting the belt to or fro, as more fully hereinafter described.

Figure 1 is a perspective view of my improvement as applied to a main-line shaft. Fig. 2 is a vertical longitudinal section in the line of the axis of the shaft.

In the accompanying drawings, which form a part of this specification, A represents a line of shafting supported at each end in hangers B in the usual manner.

C is the driving-pulley, rigidly secured upon said shaft, which carries the belt $a$, by which motion is given to a pulley which is attached to any piece of machinery (not shown in the drawings) which it is desired to drive.

D is an independent hanger in line with the hangers which support the shaft, through which the main shaft passes to its bearings in its proper hanger.

E is an independent thimble sleeved upon the main shaft, and secured at one end to the hanger D.

F is a dead-pulley, the face of which is conical in shape, sleeved on the thimble with its base presented toward the driving-pulley, and with the largest periphery of said dead-pulley slightly smaller than the diameter of the driving-pulley.

H represents an arm provided with a hole near its upper end for the passage of a staple, $m$, driven into the longitudinal beam K, whereby the arm H is secured thereto, and is capable of being moved along the horizontal part of the staple. The lower end of the arm H is forked, and engages with the annular groove $e$ in the hub G of the dead-pulley F.

$c$ represents a spring secured to the hanger D at its lower end, and attached at its free upper end to the rod $n$, the opposite end of which is secured to the arm H.

$b$ represents a bolt secured at one end to the arm H, and attached at its opposite end to a lever, I, pivoted at $h$ in the slotted block J, secured to the longitudinal beam K, and supported by the elongated staple $s$, secured to the beam K.

L represents an inclined arm secured to the lever I, and projecting down below the belt $a$, whereby in moving the lever I toward the belt the latter will be skipped from the driving-pulley C to the dead-pulley F.

It will be perceived from the above-described construction of parts that the tendency of the spring is to draw the dead-pulley F from frictional contact with the driving-pulley C when the lever I is released.

In practice, when the belt is driving a machine from the driving-pulley and it is desired to stop the machine, the lever I is moved toward the belt-shifter, supported from the ceiling, and is employed to throw the latter from the main driving-pulley onto the dead-pulley, when the belt will run down to the smallest part of the said pulley and hang loosely thereon and remain inert with said dead-pulley. A reverse motion of the lever I will, by the forked arm H and connections described, force the dead-pulley against the driving-pulley, when the former will receive motion from the latter, when the belt, being also put in motion, will follow the tendency of all belts in motion to run to the largest periphery and run onto the driving-pulley.

By this construction and arrangement the wear of the idlers and shaft as ordinarily constructed is entirely avoided. The belt is left hanging loose enough to rest or contract, hung up in good shape out of the dust and dirt, and out of the way, with no friction and no wear, and no power required, as in the case of the ordinary loose pulley, which requires frequent lubrication to prevent running dry, heating, and wearing, for it is a well-known fact that in nearly all machines provided with a loose pulley the journal or bore of such pulley very rapidly wears out.

What I claim as my invention is—

1. The combination, with the shaft A, carrying the driving-pulley C and thimble E, sleeved on said shaft, of the conical dead-pulley F, sleeved on said thimble, and provided with an annular groove, $e$, in its hub, forked arm H, spring $c$, and rod $n$, substantially as described.

2. The combination, with the shaft A, carrying the driving-pulley C and thimble E, sleeved on said shaft, of the conical dead-pulley F, sleeved on said thimble, and provided with an annular groove, $e$, in its hub, forked arm H, spring $c$, rods $n\ b$, and belt-skipping lever I, having the projecting arm L, substantially as described, and for the purpose set forth.

MYRON H. SMITH.

Witnesses:
H. S. SPRAGUE,
F. J. SCOTT.